United States Patent [19]

Nomaguchi et al.

[11] Patent Number: 4,482,008

[45] Date of Patent: Nov. 13, 1984

[54] AIR CONDITIONER OPERABLE IN A ROOM COOLING MODE AND A ROOM WARMING MODE USING EITHER OUTDOOR AIR OR A SEPARATE HEAT SOURCE AS A SOURCE OF HEAT

[75] Inventors: Tamotsu Nomaguchi, Minoo; Masahiro Sakai, Kobe, both of Japan

[73] Assignee: Mitsubishi Denki Kabushiki Kaisha, Tokyo, Japan

[21] Appl. No.: 362,838

[22] Filed: Mar. 29, 1982

[51] Int. Cl.³ .............................................. F25B 29/00
[52] U.S. Cl. ...................................... 165/29; 62/160; 62/228.4; 62/238.6; 62/324.4; 62/509
[58] Field of Search ................. 165/29; 62/160, 196.4, 62/226, 228.1, 228.3, 228.4, 228.5, 503, 509, 324.4, 238.6

[56] References Cited

U.S. PATENT DOCUMENTS

| | | | |
|---|---|---|---|
| 3,529,659 | 9/1970 | Trask | 165/29 |
| 3,563,304 | 1/1969 | McGrath | 165/2 |
| 3,627,031 | 10/1971 | Ware | 165/22 |
| 3,777,508 | 12/1973 | Imabayashi et al. | 165/29 |
| 4,177,649 | 12/1979 | Venema | 62/228.4 |
| 4,196,595 | 4/1980 | Shaw | 62/160 |
| 4,333,316 | 6/1982 | Stamp, Jr. et al. | 62/160 |
| 4,409,796 | 10/1983 | Fisher | 62/160 |

FOREIGN PATENT DOCUMENTS

| | | | |
|---|---|---|---|
| 139252 | 10/1979 | Japan | 165/29 |
| 162833 | 12/1979 | Japan | 165/29 |

Primary Examiner—Sheldon J. Richter
Assistant Examiner—Randolph A. Smith
Attorney, Agent, or Firm—Wenderoth, Lind & Ponack

[57] ABSTRACT

The disclosed airconditioner has a refrigerant compressor connected to a refrigerant circuit through a four-way valve in each of the room cooling mode and a first room warming mode of operation. The refrigerant circuit has an indoor heat exchanger, an externally heated heat exchanger, a piping, a first electromagnetic valve and an outdoor heat exchanger connected in series. A second electromagnetic valve is connected in parallel to the outdoor heat exchanger between the piping and the four-way valve to form the refrigerant circuit along with the indoor heat exchanger, the externally heated heat exchanger and the piping for the second room warming mode of operation. During the room cooling mode and first room warming mode of operation, the first electromagnetic valve is opened and the piping and the externally heated heat exchanger hold an amount of liquid refrigerant equal to the volume of the outdoor heat exchanger, while in the second room warming mode of operation in which the second electromagnetic valve and an electromagnetic valve connected across the compressor are open the outdoor heat exchange is filled with liquid refrigerant.

19 Claims, 5 Drawing Figures

AIR CONDITIONER OPERABLE IN A ROOM COOLING MODE AND A ROOM WARMING MODE USING EITHER OUTDOOR AIR OR A SEPARATE HEAT SOURCE AS A SOURCE OF HEAT

BACKGROUND OF THE INVENTION

This invention relates to improvements in an airconditioner utilizing a vapor compressing and refrigerating cycle, and particularly to such an airconditioner having an increased airconditioning capability during a drop in outdoor temperature to efficiently cool and warm and associated room or rooms during the whole year.

Heretofore there have been widely employed airconditioners having a vapor compressing and refrigerating cycle. Because the atmosphere is used as a heat source, these airconditioners have been characterized in that the capability of warming an associated room or rooms decreases with a reduction in outdoor temperature, for example, in the winter, in cold districts, in the morning or in the evening. Particularly they have encountered the problem that, when the outdoor air falls to a few degrees Centigrade above the water freezing temperature, frost is produced on the surface of the outdoor heat exchanger resulting in a deterioration of the heat exchange capability thereof.

There has already been proposed some approaches to that problem occurring in the room warming mode of operation utilizing the atmosphere as a heat source. One of the approaches has been to provide an indoor or an outdoor heat exchanger with an electric heater serving as an auxiliary heat source. For the indoor heat exchanger with the electric heater, an indoor air blower is used to directly take out warm air while for the outdoor heat exchanger with the electric heater, the refrigerant being used is heated by the electric heater for the purpose of transporting heat to the indoors. However the use of such an electric heater as the auxiliary heat source is disadvantageous in that the cost of operation is expensive as compared with other heat sources and it requires the provision of an electric power source.

Also it has been previously known to provide the outdoor heat exchanger with a water heater. This measure requires using a boiler resulting in a high cost of equipment and also in a large-sized apparatus which inevitably occupies a large area.

On the other hand, the frost on the outdoor heat exchanger can be removed in a short time when the room cooling mode of operation is performed. This measure, however, has been disadvantageous in that such defrosting increases the heat loss from the room and the room warming mode of operation must be temporarily suspended.

In addition, there has been proposed a method involving remedying the lack of room warming capability. According to this method, a combustion device is incorporated in the indoor exchanger to heat the associated heat exchanger with the resulting combustion gas thereby to supply warm air to the interior of the particular room or rooms for room warming purposes, and the combustion gas is externally exhausted after having heated the heat exchanger and the room or rooms is or are cooled by a separately provided room cooling device. However, the indoor combustion device is disadvantageous in that it is necessary to provide pipes for supplying combustion air and exhausting the exhaust gas, which results in many limitations on locating the installation.

It has also been suggested to provide the outdoor heat exchanger with a combustion device as a heat source for use in the room warming mode of the operation. The combustion gas from the combustion device supplies thermal energy for evaporating the particular refrigerant being used thereby preventing a reduction in the room capability upon a decrease in the outdoor temperature. When a high temperature combustion gas is used as the heat source, it is to be understood that means are required not only to efficiently use the heat for evaporating the refrigerant but also to overcome the problem that the heating efficiency is not high. This is because even though the outdoor heat exchanger is partly heated by the combustion device, the resulting heat is partly dissipated in the piping to the indoors.

Accordingly it is an object of the present invention to provide a new and improved airconditioner including a refrigeration circuit in which a liquid and a vapor phase of the refrigerant being used are distributed in well balanced state in all of the modes of operation so that the airconditioner can be highly economically operated during the whole year.

SUMMARY OF THE INVENTION

The present invention provides an airconditioner selectively operative in a room cooling mode, a first room warming mode using the outdoor air as a heat source, and a second room warming mode using a heat generation means as a heat source. The airconditioner comprises a compressor means for compressing a refrigerant; an indoor heat exchanger disposed in heat exchange relationship with the indoor air to be operated as an evaporator during the room cooling mode of operation and as a condenser during the first and second room warming modes of operation; an outdoor heat exchanger disposed in heat exchange relationship with the outdoor air to be operated as a condenser during the room cooling mode of operation and as an evaporator during the first room warming mode of operation, the outdoor heat exchanger holding in reserve therein the refrigerant in its liquid phase during the second room warming mode of operation; a separate heat exchanger for heating the refrigerant during the second room warming mode of operation, the separate heat exchanger holding therein refrigerant in its liquid phase during both the room cooling mode and the first room warming mode of operation; heat generation means for supplying heat to the separate heat exchanger during the second room warming mode of operation; piping means for holding the refrigerant in its liquid phase during both the room cooling mode and the first room warming mode of operation, the piping means having an internal volume that when added to that of the separate heat exchanger is substantially equal to the internal volume of the outdoor heat exchanger; the piping means being connected in series to the separate heat exchanger at least during the second room warming mode of operation; first valve means connected between the piping means and the outdoor heat exchanger and open during both the room cooling mode and the first warming mode of operation and closed during the second room warming mode of operation; a first pressure reducing mechanism connected in series to the first valve means to reduce the pressure of the refrigerant flowing therethrough during the first room warming mode of operation; first bypass means for bypassing the refrigerant tending to flow into the first pressure reducing mechanism during the room cooling mode of operation; second valve means connected in parallel to the outdoor heat exchanger to be open during the second room warming mode of operation and closed during the remaining modes of operation; a second pressure reducing mechanism connected between the indoor heat exchanger and the piping means to reduce the pressure of the refrigerant flowing therethrough during the room cooling mode of operation; second bypass means for bypassing the refrigerant tending to flow into the second pressure reducing mechanism during the first and second room warming modes of operation; refrigerant flow rate adjusting means connected to the compressor mean to adjust the flow rate of the refrigerant flowing into the separate heat exchanger during the second room warming mode of operation; and control means for selectively controlling the first and second valve means and the refrigerant flow rate adjusting means to selectively put them in their operating positions according to whether operation is the room cooling mode or the first or second room warming modes of operation, respectively.

In order to selectively operate the airconditioner in the first and second room warming modes, the control means can be connected to a temperature sensor means for sensing the outdoor temperature and being responsive to the sensed outdoor temperature to select either the first or second room warming modes of operation.

In a preferred embodiment of the present invention, the airconditioner can comprise a refrigerant compressor; a four-way valve; an outdoor heat exchanger disposed in heat exchange relationship with the outdoor air and to be operated as a condenser during the room cooling mode of operation and as an evaporator during the first and second room warming modes of operation, the outdoor heat exchanger holding refrigerant in its liquid phase during the second room warming mode of operation; a parallel connected component constituted by a first check valve connected for permitting refrigerant to flow therethrough during the room cooling mode of operation and a first pressure reducing mechanism for reducing the pressure of the refrigerant flowing therethrough during the first room warming mode of operation; a first electromagnetic valve open during both the room cooling mode and the first room warming mode of operation and closed during the second room warming mode of operation; a piping for holding the refrigerant in its liquid phase during both the room cooling mode and the first room warming mode of operation; a separate heat exchanger heated by a burner to heat the refigerant, the separate heat exchanger holding the refrigerant in its liquid phase during both the room cooling mode and the first room warming mode of operation, a further parallel connected component constituted by a second check valve connected for permitting the refrigerant to flow therethrough during the first and second room warming modes of operation and a second pressure reproducing mechanism for reducing the pressure of the refrigerant during the room cooling mode of operation; and an indoor heat exchanger disposed in heat exchange relationship with the indoor air to be operated as an evaporator during the room cooling mode of operation and as a condenser during the first room warming mode of operation; all the foregoing components being connected in series with one another in the named order and the indoor refrigerant being supplied through the four way valve to form a refrigeration circuit in each of the room cooling mode and the first room warming mode of operation and the internal volume of the piping being substantially equal to the difference between the internal volume of the outdoor heat exchanger and the separate heat exchanger. The airconditioner further comprises a second electromagnetic valve connected in parallel to the outdoor heat exchanger between the piping and the four-way valve and which is open during the second room warming mode of operation and closed during the remaining modes of operation, which valve forms a refrigerant circuit with the piping, the indoor heat exchanger and the components disposed therebetween during the second room warming mode of operation, and a series connected third electromagnetic valve and a throttle mechanism connected between the delivery and suction sides of the compressor, the third electromagnetic valve being open during the second room warming mode of operation.

BRIEF DESCRIPTION OF THE DRAWINGS

The present invention will become more readily apparent from the following detailed description taken in conjunction with the accompanying drawing in which.

Throughout the Figures like reference numerals designate the identical or corresponding components.

DESCRIPTION OF THE PREFERRED EMBODIMENTS

Figure 1:
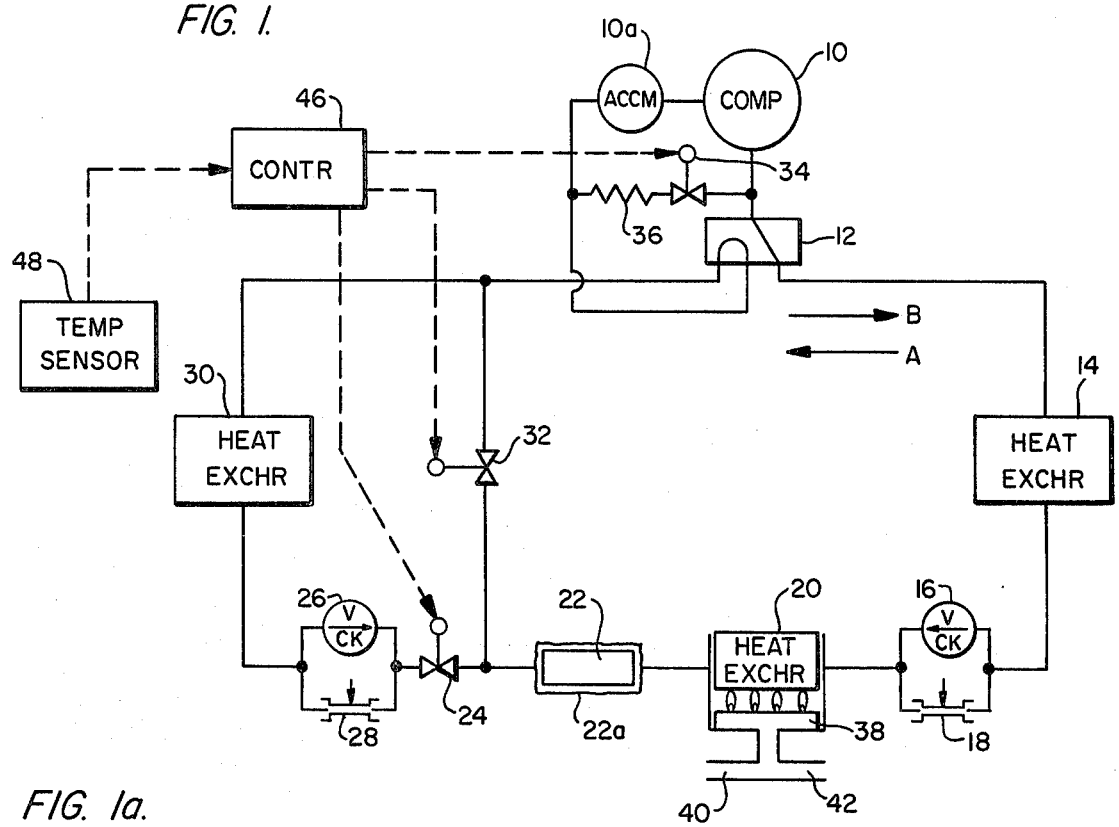
FIG. 1 is a block diagram of a refrigerant circuit according to one embodiment of airconditioner of the present invention.

Referring now to FIG. 1 of the drawings, there is illustrated a refrigeration circuit according to one embodiment of the airconditioner of the present invention and capable of being selectively operated in a room cooling mode, a first room warming mode using the outdoor air as a heat source and a second room warming mode using a burner as the heat source. The arrangement illustrated comprises an electrically driven refrigerant compressor 10 with an accumulator 10a and having the output side connected through a four-way reversing valve 12 to a refrigeration circuit constituted by an indoor heat exchanger 14, a first parallel connected component connected in series with said indoor heat exchanger and consituted by a check valve 16 connected for permitting flow away from said indoor heat exchanger and a pressure reducing mechanism 18, a separate heat exchanger 20 connected in series with said first parallel connected component, and a refrigeration piping 22 connected in series with said separate heat exchanger. An electromagnetic valve 24 is connected in series with said piping, and a second parallel connected component is connected in series with said electromagnetic valve and is constituted by a check valve 26 connected for permitting flow toward said electromagnetic valve and a pressure reducing mechanism 28. The pressure reducing mechanism 18 and 28 can be capillary tubes. An outdoor heat exchanger 30 is connected in series with said second parallel connected component and is in turn connected to the four-way reversing valve 12 to complete a closed loop refrigeration circuit as shown by the solid lines in FIG. 1. Further an electromagnetic valve 32 is connected across or in parallel with the electromagnetic valve 24, second parallel connected component 26-28 and outdoor heat exchanger 30 to form a branch in the refrigeration circuit, as shown also by the solid lines in FIG. 1.

Figure 1A:
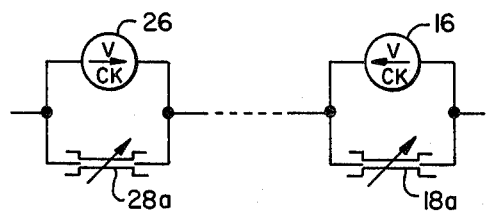
FIG. 1a is a partial diagram of FIG. 1 showing a modified form of pressure reducing means.

The pressure reducing means 18 and 28 can be variable pressure reducing means 18a or 28a as shown in FIG. 1a, which can be varied from a state where it produces substantially no pressure reduction to a state where it produces a maximum pressure reduction.

The compressor 10 and accumulator 10a have connected in parallel therewith a series connected electromagnetic valve 34 and a throttle mechanism 36 for a purpose which will be apparent later. The four-way reversing valve 12 is connected across the delivery and suction sides of the compressor 10 and can cause the refrigerant to flow through the refrigeration circuit from the compressor 10 in the direction of the arrow A shown in FIG. 1 during the room cooling mode of operation and in the direction of the arrow B also shown in FIG. 1 during the first and second room warming modes of operation.

The indoor heat exchanger 14 is disposed in heat exchanger relationship with the indoor air while the outdoor heat exchanger 30 is disposed in heat exchange relationship with the outdoor air. The separate heat exchanger 20 is operatively coupled to heat generation means such as a burner 38. The burner 38 is supplied with a fuel-air mixture preliminarily prepared by mixing air from an air feed tube 40 with a fuel from a fuel feed tube 42 in a proper proportion in order to prevent soot from being generated during the combustion process. In the second room warming mode of operation, the burner 38 burns the fuel-air mixture to supply combustion heat to the separate heat exchanger 20. That is, this heat exchanger 20 exchanges heat between the refrigerant flowing therethrough and the resulting combustion gas.

The arrangement further comprises a control unit 46 and a temperature sensor 48 operatively coupled to the control unit to sense the outdoor temperature.

As pointed out above, check valve 16 is connected in the refrigeration circuit so that the refrigerant is permitted to flow therethrough from the indoor heat exchanger 14 to the separate heat exchanger 20, that is during the first and second warm modes of operation, while the check valve 26 is connected to permit the refrigerant to flow therethrough from the outdoor heat exchanger 30 to the electromagnetic valve 24.

The operation of the arrangement shown in FIG. 1 will now be described. During the room cooling mode of operation, the control unit 46 is operated to close the electromagnetic valves 32 and 34 and open the electromagnetic valve 24 and the four-way valve 12 is set to cause the refrigerant to flow in the direction of arrow A. Thus the compressed refrigerant from the compressor 10 flows through the refrigeration circuit from the compressor 10 through the four-way valve 12, the outdoor heat exchanger 30, the check valve 26, the now open electromagnetic valve 24, the piping 22, the heat exchanger 20, the pressure reducing mechanism 18, the indoor heat excchamber 14, the four-way valve 12 and thence to the compressor 10.

Under these circumstances the indoor heat exchanger 14 is operated as an evaporator while the outdoor heat exchanger 30 is operated as a condenser, with the result that the heat exchanger 20 and the piping 22 located upstream of the pressure mechanism 18 with respect to the stream of the refrigerant are fully filled with the refrigerant in its liquid phase. Also the pressure reducing mechanism 28 operates to reduce the pressure of the refrigerant passing therethrough.

In the first room warming mode of operation in which the outdoor air is used as the heat source, the control unit 40 is also operated to close the electromagnetic valves 34 and 32 and open the electromagnetic valve 24, but the four-way valve is set to cause the refrigerant to flow in the direction of arrow B. Thus the compressed refrigerant flows through a refrigeration circuit from the compressor 10 through the four-way valve 12, the indoor heat exchanger 14, the check valve 16, the heat exchanger 20, the piping 22, the now open electromagnetic valve 24, the pressure reducing mechanism 28, the outdoor heat exchanger 30, the four-way valve 12 and thence to the compressor 10. Under these circumstances the heat exchangers 14 and 30 serve as a condensor and an evaporator respectively. Thus the piping 22 and the heat exchanger 20 now located upstream of the pressure reducing mechanism 28 with respect to the stream of the refrigerant are substantially fully filled with the refrigerant in its liquid phase. The pressure reducing mechanism 18 is operated to reduce the pressure of the refrigerant flowing therethrough.

In the second room warming mode of operation using the heat of the combustion gases as a heat source, the control unit is separated to close the electromagnetic valve 24 and to open the electromagnetic valves 32 and 34, and the four-way valve is set to cause the refrigerant to flow in the direction of arrow B. Therefore the compressed refrigerant flows partly through a refrigeration circuit extending from the compressor 10 through the four-way valve 12, the indoor heat exchanger 14, the check valve 16, the heat exchanger 20, the piping 22, the now open electromagnetic valve 32, the four-way valve 12 and thence to the compressor 10 on the one hand and partly through a path from the compressor 10 through the now open electromagnetic valve 34 the throttle mechanism 36 and thence to the compressor 10 on the other hand. Under these circumstances the indoor heat exchanger 14 is operated as a condenser while the heat exchanger 20 is operated as an evaporator so that the refrigerant is evaporated at a pressure and at a temperature which is high as compared with the evaporation pressure and temperature during the first room warming mode of operation. Also the outdoor heat exchanger 30 condenses the refrigerant therein and is filled with refrigerant in its liquid phase during the steady-state operation. This is because the electromagnetic valve 24 is in its closed position.

As described above, the control unit 46 selectively controls the closure and opening of the electromagnetic valves 24, 32 and 34 to selectively operate the arrangement of FIG. 1 in the room cooling mode and the first and second room warming modes. To this end, the control unit 46 connected to the temperature sensor 48 has stored therein a a predetermined temperature which is a temperature at which the outdoor heat exchanger 30 can no longer provide a predetermined room warming capability as a result of a decrease of the outdoor temperature and a consequent reduction in the quantity of heat which can be exchanged therewith. The control unit 46 compares that predetermined set temperature with the outdoor temperature sensed by the temperature sensor 48 to determine if the sensed temperature is less than the set temperature. If it is determined to be less, the control unit 46 controls the electromagnetic valves 24, 32 and 34 to operate the arrangement of FIG. 1 in the second room warming mode. Otherwise the control unit 46 controls those electromagnetic valves to operate the arrangement in the first room warming mode.

Figure 2:
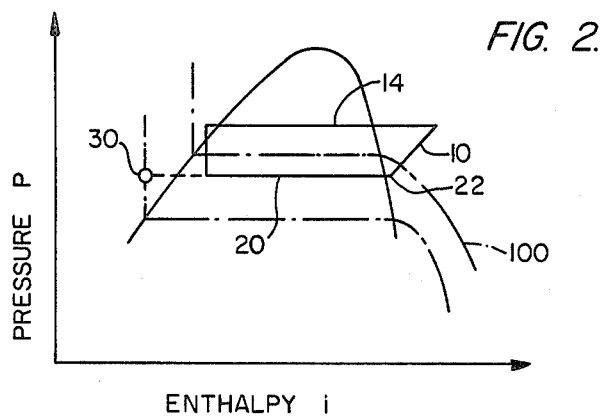
FIG. 2 is a graph illustrating the relationship between the enthalpy of a refrigerant and the pressure thereof and which is useful in explaining the operation of the arrangement shown in FIG. 1.

The fact that the outdoor heat exchanger 30 is fully filled with the refrigerant in its liquid phase is effective for insuring that the heat exchanger 30 dissipates only an extremely small quantity of heat to the outdoor air. This will now be described in conjuction with FIG. 2 wherein there is illustrated a pressure p of the refrigerant plotted on the ordinate against an enthalpy i thereof on the abscissa. FIG. 2 illustrates the heat cycle during the second room warming mode of operation using an external heat source such as the burner 38 on a Mollier chart for the refrigerant. The heat cycle includes those portions designated by the reference numerals 10, 14, 20, 22 and 30 and corresponding to the compressor 10, the indoor heat exchanger 14, the heat exchanger 20, the piping 22 and the outdoor heat exchanger 30 respectively. Also FIG. 2 shows a pair of isothermal dotted-and-dashed lines, one of which is designated by the reference numeral 100.

From FIG. 2, it is seen that the pressure of the refrigerant in the outdoor heat exchanger 30 is substantially equal to that in the heat exchanger 20 but the temperature within the former heat exchanger is far less than that within the latter and rather close to the outdoor temperature. This means that the outdoor heat exchanger 30 dissipates hardly any heat to the outdoor air.

Further heat from the heat exchanger 20 is transmitted to the outdoor heat exchanger 30 only through the refrigerant piping connecting the two heat exchangers to each other. In other words this transmission of heat is conducted through the refrigerant in its liquid phase flowing through that piping or the thick wall portion thereof, resulting in an extremely small quantity of transmitted heat.

Accordingly, even though the outdoor heat exchanger 30 is cooled by external air which may contact it, the resulting dissipation of heat is very minute. Therefore it is possible to efficiently transmit a quantity of heat absorbed by the refrigerant in the heat exchanger 20 to the indoor heat exchanger 14.

Also the piping 22 is shown in FIG. 1 as being coated with a thermally insulating material 22a. Because the thermally insulating material 22a is effective for reducing the heat exchange between the piping 22 and that portion of the outdoor air surrounding the latter, the refrigerant remains in its vapor or gas phase (see FIG. 2).

As described above, the heat exchanger 20 and the piping 22 are fully filled with the refrigerant in its liquid phase during the first room warming mode of operation while the outdoor heat exchanger 30 is fully filled with the refrigerant in its liquid phase in the second room warming mode thereof. Accordingly, in order to ensure good operation during both the first and second room warming modes, it is important that the piping 22 have an internal volume substantially equal to the difference between the internal volume of the outdoor heat exchanger 30 and the internal volume of the heat exchanger 20.

Since the heat exchanger 20 is subjected to combustion gas having a temperature higher than that of the outdoor air as the auxiliary heat source, it can have a fairly small-size as compared with the outdoor heat exchanger 30, and thus have a relatively small internal volume. Therefore it will readily be understood that the purpose of the piping 22 is to substantially compensate for the difference between the internal volumes of the heat exchangers 20 and 30.

The outdoor heat exchanger 30 serves as a liquid reservoir during the second room warming mode of operation and the heat exchanger 20 and the piping 22 serve as liquid reservoirs during both the first room warming mode using the outdoor air as the heat source and the room cooling mode. Thus in either the room warming or room cooling mode of operation just described, the refrigeration circuit has refrigerant therein the liquid phase of which is substantially identical in distribution to the vapor phase.

From this it is seen that, by preliminarily designing the airconditioner to have a proper distribution of the liquid and vapor phases of the refrigerant, it is possible to carry out satisfactory operation at all times.

By making the inside diameter of the check valve 16 and the electromagnetic valve 32 larger than that of the check valve 26 and the electromagnetic valve 24, the power required for the compressor 10 can be effectively reduced during the second room warming mode of operation. This is because the check valve 16 and the electromagnetic valve 32 have the refrigerant flowing therethrough in its vapor and liquid phases or in its vapor phase in the second room warming mode of operation so that the use of an inside diameter as large as possible decreases the pressure loss.

Since the refrigeration circuit when it is operating in the second room warming mode of operation has a reduced pressure loss and utilizes heat from combustion gases at an elevated temperature as the heat source, as described above, the refrigerant can be evaporated at a high pressure within the heat exchanger 20 and the compressor 10 can be operated at an extremely small compression ratio. Thus the work of compression for compressing refrigerant is small as compared with that required during the room cooling mode or the first room warming mode of operation. However an increase in evaporating pressure causes a decrease in the specific volume of the refrigerant sucked in by the compressor 10. Therefore the mass flow rate of the refrigerant and therefore the quantity of refrigerant recirculating through the refrigeration circuit increases. This increase in the quantity of recirculating refrigerant causes an increase pressure loss in the refrigeration circuit. As a result, the overall work of compression is not actually decreased, which will be evident from the following relationship between the capability of the airconditioner of warming the room and the quantity of recirculating refrigerant, which can be expressed by:

$$R = qG \infty qVN/v \quad (1)$$

where R designates the room warming capability in Kcal/hr, q the room warming effect in Kcal/Kg, V the volume of the compressor in $m^3$, v the specific volume in $m^3/kg$ of the refrigerant sucked in by the compressor, N the number of rotations of the compressor per minute, and G the quantity of recirculating refrigerant in kg/hr. Assuming that a constant load is imposed during room warming and R, q, N and V are constant, a rise in the evaporating pressure causes a decrease in specific volume until the quantity of refrigerant recirculating is in excess of a proper value relative to the room warming capability R.

It is particularly noted that because the same compressor used in both the room cooling mode and the first room warming mode of operation is used in the second room warming mode of operation, the quantity of refrigerant recirculating through the refrigerant circuit during the second room warming mode of operation is greatly in excess of that actually needed. In order to reduce this excessive quantity of recirculating refrigerant, the present invention includes a shunt circuit formed of the electromagnetic valve 34 and the throttle mechanism 36 serving as refrigerant flow rate adjusting means. During the second room warming mode of operation, the electromagnetic valve 34 is opened by the control unit 46 to permit a portion of the refrigerant delivered from the delivery side of the compressor 10 to be shunted to the suction side thereof. The throttle mechanism 36 controls the quantity of the shunted refrigerant so that the heat exchanger 30 has a quantity of refrigerant flowing therethrough just sufficient for a predetermined room warming capability. This measure permits the pressure loss in the refrigerant circuit to be greatly reduced so as to reduce the power required for the compressor 10 during the second room warming mode of operation.

Figure 3:
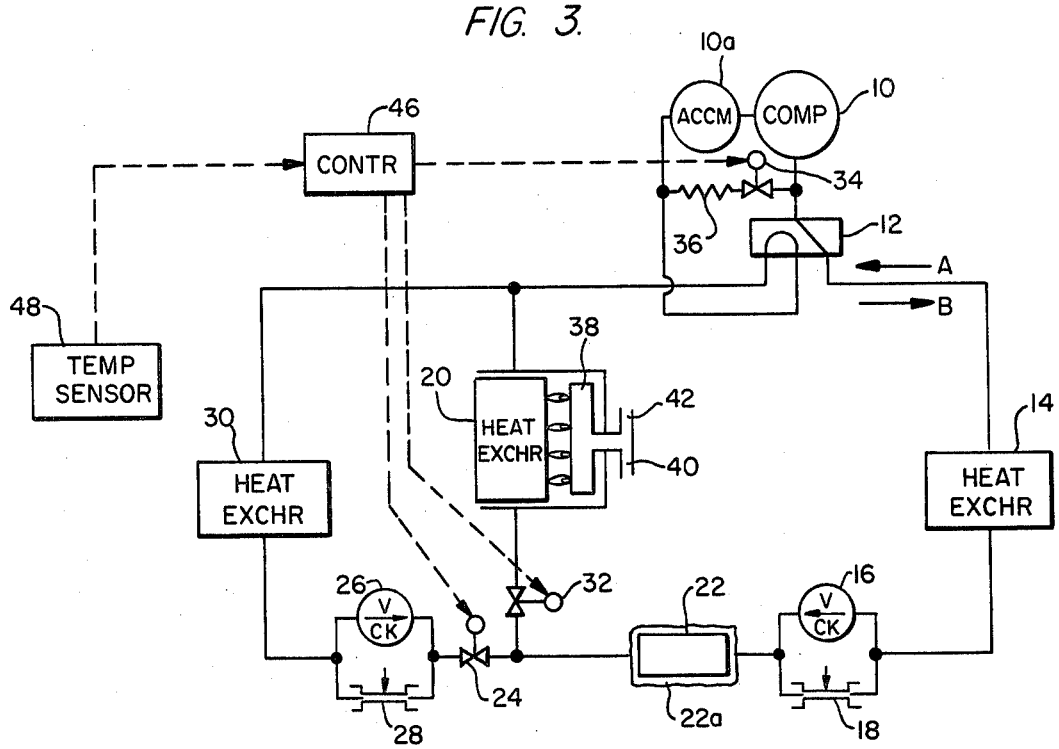
FIG. 3 is a diagram similar to FIG. 1 but illustrating a modification of the present invention.

While the present invention has been illustrated and described in conjuction with the heat exchanger 20 located downstream of the parallel connected component constituted by the check valve 16 and the pressure reducing mechanism 18 relative to the stream of the refrigerant flowing during the first and second room warming modes of operation, it is to be understood that the invention is not limited to this arrangement and that the heat exchanger 20 may be located downstream of the elctromagnetic valve 32. This arrangement is shown in FIG. 3, wherein there is illustrated a modification of the present invention. The arrangement illustrated is different from that shown in FIG. 1 only in that in FIG. 3 the heat exchanger 20 is directly connected in series with the electromagnetic valve 32 on that side thereof nearer to the four-way valve.

In the arrangement in FIG. 1 the quantity refrigerant flowing through the refrigerant circuit during the second room warming mode of operation is adjusted to the optimum quantity by the electromagnetic valve 34 and the throttle mechanism 36 for shunting one portion of the refrigerant from the delivery side of the compressor 10 to the suction side thereof. However it is to be understood that the present invention is not limited to such means for adjustment of the flow rate of the refrigerant and that it is possible to control the flow rate of the refrigerant by adjusting the speed of rotation of the compressor 10 as will be seen from the expression (1). For example, a frequency converter for controlling a frequency of an electric power supplied to an electric motor for the compressor 10 can be used for this purpose.

Figure 4:
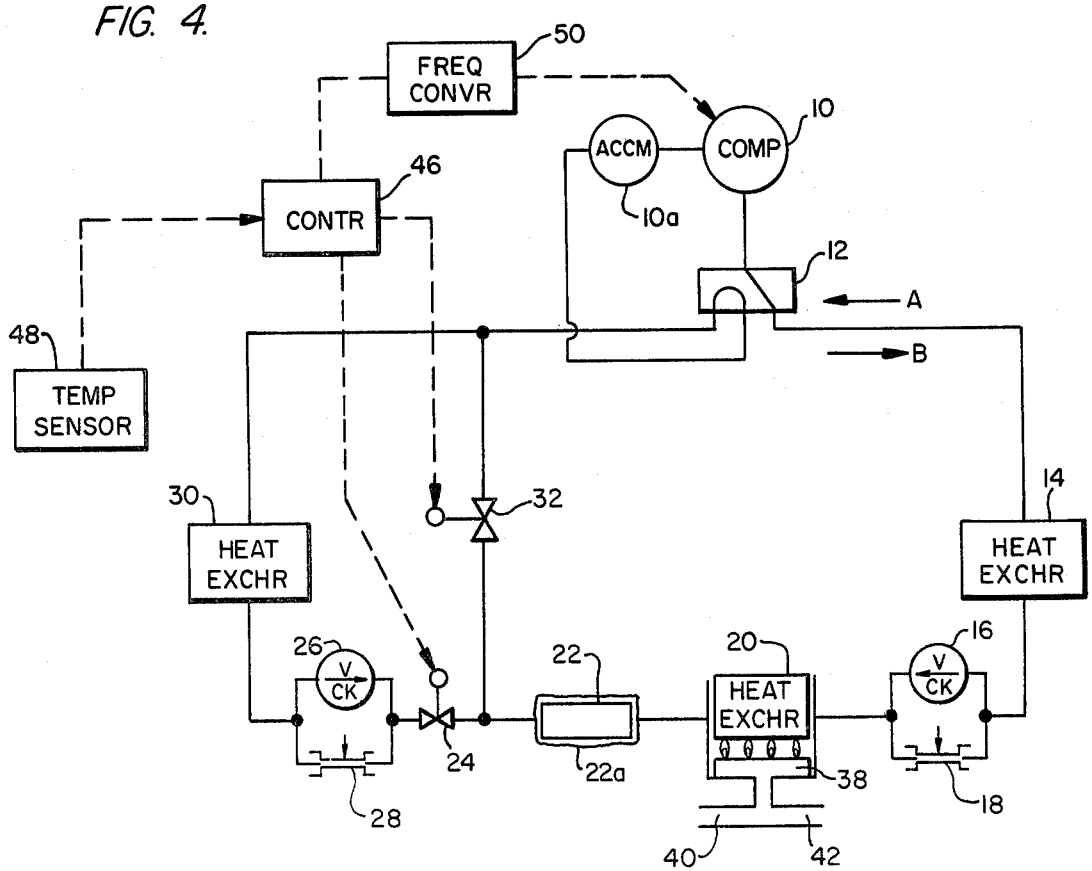
FIG. 4 is a diagram similar to FIG. 1 but illustrating another modification of the present invention.

FIG. 4 shows another modification of the present invention wherein a frequency converter 50 is connected between the control unit 40 and the compressor 10 and the third electromagnetic valve 34 and the throttle mechanism 36 are omitted.

In other respects the arrangement illustrated is identical to that shown in FIG. 1.

In the arrangement of FIG. 4 the frequency converter 48 is responsive to a control signal from the control unit 46 to control the frequency of the current from an associated power supply. The compressor 10 during the second room warming mode of operation is required to have its speed of rotation less than that for both the room cooling mode and the room warming mode of operation. Thus, during the second room warming mode of operation, the frequency of the current supplied through the frequency converter is reduced in proportion to the speed of rotation required for the compressor 10 and the reduced frequency current is supplied to the electric motor for the compressor 10. This measure causes the flow rate of the refrigerant recirculating through the heat exchanger 20 to be adjusted to a proper magnitude resulting in a reduction in electric power required for operation of the compressor.

The present invention has several advantages. For example, the heat loss due to the heat dissipated to the outdoor air can be reduced during the second room warming mode of operation, and also the refrigerant has its liquid and vapor phases distributed in a well balanced state within the refrigerant circuit and all of the modes of operation. Accordingly the present airconditioner can be highly economically operated during the whole year.

While the present invention has been illustrated and described in conjunction with a few preferred embodiments thereof it is to be understood that numerous changes and modifications may be resorted to without departing from the spirit and scope of the present invention. For example, the compressor 10 may be replaced by a volume controlled compressor including a so-called bypass passageway with a control valve disposed in the main body thereof and the electromagnetic valve 34 and the throttle mechanism 36 omitted.

What is claimed is:

1. An airconditioner selectively operative in a room cooling mode, a first room warming mode using the outdoor air as a heat source, and a second room warming mode using a heat generator means as a heat source, the airconditioner comprising:
   compressor means for compressing a refrigerant;
   a refrigerant circuit composed only of:
      an indoor heat exchanger disposed in heat exchange relationship with the indoor air in the room to be airconditioned for being operated as an evaporator in said room cooling mode of operation and a condenser in said first and second room warming modes of operation;
      a first parallel connected component connected in series with said indoor heat exchanger and having first pressure reducing means for reducing the pressure of the refrigerant flowing therethrough and a first bypass means connected in parallel with said first pressure reducing means and permitting flow of refrigerant only in a direction away from said indoor heat exchanger;
      piping means connected in series with said first parallel connected component for holding refrigerant in its liquid phase during both said room cooling mode and said first room warming mode of operation;
      a second parallel connected component connected in series with said piping means and having second pressure reducing means for reducing the pressure of the refrigerant passing therethrough and a second bypass means connected in parallel with said second pressure reducing means and permitting flow of refrigerant only in a direction toward said piping means;

an outdoor heat exchanger disposed in heat exchange relationship with the outdoor air and connected in series with said second parallel connected component for being operated as an evaporator in said room cooling mode of operation and a condenser in said first and second room warming modes of operation; and a bypass connected in parallel with said outdoor heat exchanger and having bypass valve means therein for being open in said second room warming mode of operation and closed during the remaining modes of operation;

reversing valve means connected between said compressor and said refrigerant circuit at a point between said indoor and outdoor heat exchangers and for selectively directing refrigerant in one or the other direction through the refrigerant circuit;

control valve means connected in said refrigerant circuit between said outdoor heat exchanger and the end of the bypass connected on the side of said outdoor heat exchanger which is toward said indoor heat exchanger;

a separate heat exchanger connected in said refrigerant circuit for having refrigerant flowing therethrough when said bypass valve means is open and said control valve means is closed, said separate heat exchanger being for heating said refrigerant during said second room warming mode of operation and for holding refrigerant in its liquid phase during both said room cooling mode and said first room warming mode of operation;

said piping means having an internal volume substantially equal to only the difference between the internal volume of said outdoor heat exchanger and the internal volume of said separate heat exchanger;

heat generation means operatively associated with said separate heat exchanger and operable for imparting heat to said separate heat exchanger during said second room warming mode of operation;

refrigerant flow rate adjusting means connected to said compressor means and operable during said second room warming mode of operation for adjusting the flow rate of the refrigerant flowing into said separate heat exchanger during said second room warming mode of operation; and control means connected to said control and bypass valve means and to said refrigerant flow rate adjusting means for selectively placing them in their desired operating conditions according to whether the operation of said airconditioner is to be in said room cooling mode or said first or second room warming mode, whereby when said airconditioner is operated in said second room warming mode said outdoor heat exchanger is filled with liquid refrigerant so as to radiate little or no heat therethrough.

2. An airconditioner as claimed in claim 1 further comprising temperature sensor means for sensing the outdoor temperature and connected to said control means, said control means being responsive to the sensed outdoor temperature for selecting said first or second room warming modes for operation depending on whether the outdoor temperature is above or below a predetermined temperature.

3. An airconditioner as claimed in claim 1 wherein heat generation means comprises a burner.

4. An airconditioner as claimed in claim 1 wherein said heat generation means comprises means for supplying a combustion gas to said separate heat exchanger.

5. An airconditioner as claimed in claim 1 wherein said piping means has a coating of a heat insulating material for suppressing heat exchange between the piping means and the atmosphere therearound.

6. An airconditioner as claimed in claim 1 wherein said piping means is connected to a refrigerant tube and has a larger inside diameter than said refrigerant tube.

7. An airconditioner as claimed in claim 1 wherein said contol valve means and said bypass valve means are electromagnetic valves.

8. An airconditioner as claimed in claim 1 wherein at least one of said first and second pressure reducing means comprises at least a capillary tube.

9. An airconditioner as claimed in claim 1 wherein at least one of said first and second bypass means comprises a check valve connected across the associated one of said first and second pressure reducing means.

10. An airconditioner as claimed in claim 1 wherein said pressure reducing means in at least one of said parallel connected components is a variable pressure reduction mechanism for changing the pressure reduction from substantially no reduction to a maximum reduction for setting the pressure reduction to the optimum magnitude in accordance with the mode of operation.

11. An airconditioner as claimed in claim 1 wherein said refrigerant flow rate adjusting means comprises bypass means connected between the high pressure side of said compressor means and the low pressure side thereof.

12. An airconditioner as claimed in claim 11 wherein said bypass means includes further control valve means which is open during said second room warming mode of operation.

13. An airconditioner as claimed in claim 12 wherein said further control valve means is an electromagnetic valve.

14. An airconditioner as claimed in claim 1 wherein said refrigerant flow rate adjusting means comprises a series connected electromagnetic valve and a throttle mechanism connected between the high and low pressure sides of said compressor means, and said control means is connected to said electromagnetic valve for opening said lastmentioned eletromagnetic valve during said second room warming mode of operation.

15. An airconditioner as claimed in claim 1 wherein said refrigerant flow rate adjusting means comprises a variable speed compressor for reducing the speed of rotation during said second room warming mode of operation.

16. An airconditioner as claimed in claim 15 wherein said variable speed compressor comprises an electric motor and means for controlling the frequency of the electric power supplied to said electric motor thereby to change the speed of rotation of said compressor means.

17. An airconditioner as claimed in claim 1 wherein said reversing valve means is a four-way valve connected across the delivery and a suction side of said compressor means and operative to reverse the direction of flow of the refrigerant.

18. An airconditioner as claimed in claim 1 wherein said separate heat exchanger is connected in series with said piping means.

19. An airconditioner as claimed in claim 1 wherein said separate heat exchanger is connected in said bypass in series with said bypass valve means.

* * * * *